(12) United States Patent
Gu

(10) Patent No.: US 8,952,639 B2
(45) Date of Patent: Feb. 10, 2015

(54) APPARATUS AND METHOD FOR CONTROLLING MOTOR

(71) Applicant: Samsung Electro-Mechanics Co., Ltd., Suwon, Gyunggi-do (KR)

(72) Inventor: Bon Young Gu, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 141 days.

(21) Appl. No.: 13/830,067

(22) Filed: Mar. 14, 2013

(65) Prior Publication Data
US 2014/0152213 A1 Jun. 5, 2014

(30) Foreign Application Priority Data
Dec. 3, 2012 (KR) .................. 10-2012-0138921

(51) Int. Cl.
H02P 6/16 (2006.01)

(52) U.S. Cl.
CPC .......................................... *H02P 6/16* (2013.01)
USPC .................. 318/400.13; 318/400.01; 318/700

(58) Field of Classification Search
CPC ......................................................... H02P 6/16
USPC .................. 318/400.13, 400.01, 700
See application file for complete search history.

(56) References Cited

U.S. PATENT DOCUMENTS 7,408,315 B2 * 8/2008 Tsubota .................. 318/605

FOREIGN PATENT DOCUMENTS

KR 2007-0071671 A 7/2007

* cited by examiner

*Primary Examiner* — David S Luo
(74) *Attorney, Agent, or Firm* — McDermott Will & Emery LLP

(57) ABSTRACT

There are provided an apparatus and a method for controlling a motor. The apparatus for controlling a motor includes a signal generation unit generating a first signal indicating position information of a rotor, a counter unit sampling the first signal with a second signal different from the first signal for one period to count a sampling frequency, a memory unit storing a section counter value and an error value obtained by sampling a period immediately prior to the first signal with the second signal, and a comparison unit increasing and reducing an output signal when the sampling frequency counted by the counter unit coincides with the section counter value, wherein the comparison unit sums the sampling frequencies corresponding to error values with the sampling frequency of the first signal before the counter unit ends the sampling of one period of the first signal.

13 Claims, 2 Drawing Sheets

APPARATUS AND METHOD FOR CONTROLLING MOTOR

CROSS-REFERENCE TO RELATED APPLICATIONS

This application claims the priority of Korean Patent Application No. 10-2012-0138921 filed on Dec. 3, 2012, in the Korean Intellectual Property Office, the disclosure of which is incorporated herein by reference.

BACKGROUND OF THE INVENTION

1. Field of the Invention

The present invention relates to an apparatus and a method for controlling a motor, capable of efficiently controlling a motor by detecting a position of a rotor with a required resolution and reducing an error at the time of detecting a position of a rotor, by sampling a first signal generated in pulse form from an output of a position sensor such as a hall sensor, or the like, generating a section counter value and an error value by dividing a sampled frequency with the required resolution, and reflecting the generated section counter value and error value in a first signal sampling of a subsequent period, in detecting the position of the rotor.

2. Description of the Related Art

Generally, a brushless direct contact (BLDC) motor may be controlled with a pulse width modulation (PWM) signal. In an apparatus for controlling a motor based on an analog circuit, a delay time, and the like, is determined by external devices, and therefore may have a fixed value, independent of a speed of a motor, but the number of devices may be increased further than that of a digital circuit. Therefore, a need exists for technology able to accurately detect a speed and a current position of a rotor while replacing an analog circuit with a digital circuit.

In the related art, when a position of a rotor is detected using a hall sensor, or the like, a method of converting a signal output from the hall sensor into a signal having a pulse form and sampling a pulse signal within one period in which a value of a pulse signal is changed from a low level to a high level or from a high level to low level has been used. For example, when a total of N-time sampled frequency is generated within a period immediately prior to the pulse signal, the position of the rotor may be detected under the assumption that the same N-time sampled frequency also appears in a current period.

In this case, the resolution of detecting the speed, the position, and the like of the rotor within one period of the pulse signal is determined according to a period of the pulse signal and a period of a signal in which the pulse signal is sampled. Therefore, in the case that any value is selected as the resolution, an accurate position may not be detected with a required resolution when the frequency sampled within one period of the pulse signal is not a multiple of resolution.

The Related Art Document below relates to an RTC frequency compensation circuit included in a mobile communications terminal and discloses contents of counting a low frequency clock signal with a high frequency clock signal and compensating for a counter value of the low frequency clock signal by computing an error value when an error occurs. However, the Related Art Document does not disclose contents of detecting a position of a rotor by comparing an error value computed in an immediately prior period and a counter value of an immediately prior period with a counter value of a current period when the required detection resolution is applied.

[Related Art Document]
Korean Patent Laid-Open Publication No. 10-2007-0071671

SUMMARY OF THE INVENTION

An aspect of the present invention is to provide to an apparatus and a method for controlling a motor, capable of efficiently controlling a motor, by comparing a section counter value detected in a period immediately prior to a first signal indicating a position of a rotor with a sampling counter frequency of a current period of the first signal, changing an output signal when a sampling counter frequency coincides with a section counter value, and summing an error value of an immediately prior period with the sampled results so as to detect a position of a rotor with a required resolution within one period of a first signal.

According to an aspect of the present invention, there is provided an apparatus for controlling a motor, including: a signal generation unit generating a first signal indicating position information of a rotor; a counter unit sampling the first signal with a second signal different from the first signal for one period to count a sampling frequency; a memory unit storing a section counter value and an error value obtained by sampling a period immediately prior to the first signal with the second signal; and a comparison unit increasing and reducing an output signal when the sampling frequency counted by the counter unit coincides with the section counter value, wherein the comparison unit sums the sampling frequencies corresponding to error values with the sampling frequency of the first signal before the counter unit ends the sampling of one period of the first signal.

The comparison unit may sum the sampling frequency corresponding to the error value with the sampling frequency of the first signal when the output signal is included in the section in which the error value is compensated.

The comparison unit may sum all sampling frequencies corresponding to the error value with the sampling frequency of the first signal simultaneously in the section in which the error value is compensated.

The comparison unit may divide the sampling frequency corresponding to the error value in the section in which the error values are compensated and may sum the divided sampling frequency with the sampling frequency of the first signal multiple times.

The comparison unit may maintain the value of the output signal as it is when the sampling frequency corresponding to the error value is summed with the sampling frequency of the first signal in the section in which the error value is compensated.

The apparatus for controlling a motor may further include: an arithmetic operation unit generating the section counter value and the error value according to a precision of detecting the position information of the rotor.

The comparison unit may increase the output signal by a predetermined value whenever a frequency of sampling one period of the first signal by the counter unit coincides with the section counter value.

According to another aspect of the present invention, there is provided a method of controlling a motor, including: counting a sampling frequency by sampling one period of a first signal indicating position information of a rotor with a second signal; comparing a section count value of a period immediately prior to the first signal with the sampling frequency; and controlling an output signal value when the sampling frequency coincides with the section counter value, wherein the sampling frequency corresponding to an error value of the period immediately prior to the first signal is summed with the sampling frequency of one period of the first signal, before the sampling of one period of the first signal ends.

All sampling frequencies corresponding to the error value may be summed with the sampling frequency of the first signal simultaneously when the output signal is included in the section in which the error value is compensated.

The sampling frequency corresponding to the error value may be divided and summed with the sampling frequency of the first signal multiple times when the output signal is included in the section in which the error value is compensated.

The value of the output signal may be maintained as it is when the sampling frequency corresponding to the error value of the period immediately prior to the first signal is summed with the sampling frequency of one period of the first signal.

In the controlling of the output signal, the output signal may be increased by a predetermined value whenever a frequency of sampling one period of the first signal coincides with the section counter value.

The method of controlling a motor may further include: generating the sampling frequency, the section counter value, and the error value over the one period when the sampling of one period of the first signal ends; and updating the section counter value and the error value of the period immediately prior to the first signal with the section counter value and the error value over the one period.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
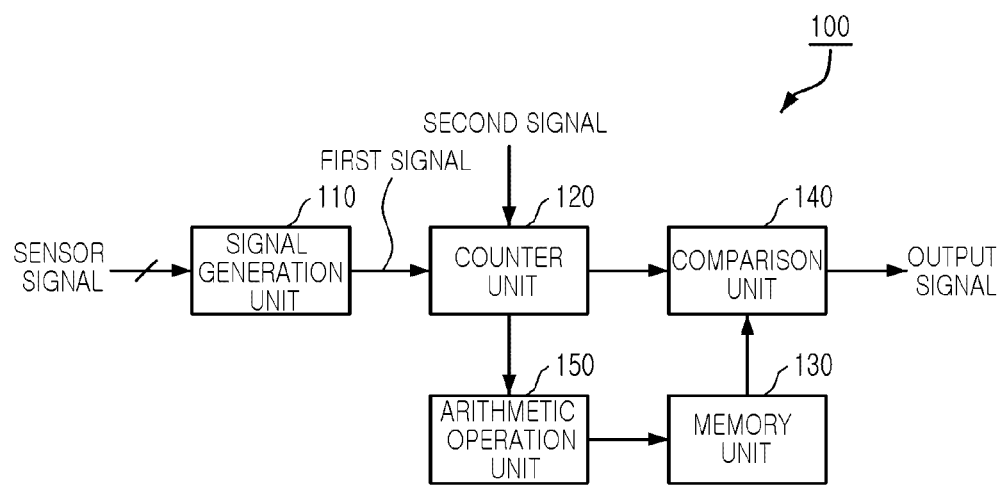
FIG. 1 is a block diagram schematically illustrating an apparatus for controlling a motor according to an embodiment of the present invention.

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

FIG. 1 is a block diagram schematically illustrating an apparatus for controlling a motor according to an embodiment of the present invention.

Referring to FIG. 1, an apparatus 100 for controlling a motor according to an embodiment of the present invention may include a signal generation unit 110, a counter unit 120, a memory unit 130, a comparison unit 140, and an arithmetic operation unit 150. The signal generation unit 110 may receive a sensor signal from a rotor position detecting sensor such as a hall sensor, and the like, included in a motor and generate a first signal having a pulse form based on the sensor signal.

The first signal having a pulse form is transferred to the counter unit 120 and the counter unit 120 samples the first signal with a second signal and counts a sampling frequency. The counter unit 120 may sample the first signal with the second signal having a shorter period than the first signal having a pulse form. For example, when one period of the first signal is 900 μs and the period of the second signal is 0.1 μs, the counter unit 120 may sample one period of the first signal 9,000 times and count the sampling frequency.

The arithmetic operation unit 150 generates a section counter value and an error value from the sampled results of the counter unit 120. The terms "section counter value" and "error value" used in embodiments of the present invention may be defined by a frequency of sampling one period of the first signal with the second signal and a value determined by the resolution for detecting the position of the rotor.

For example, when it is assumed that one period of the first signal is 900 μs, a period of the second signal is 0.1 μs, and the resolution for detecting the position of the rotor is 100, the section counter value becomes 90, obtained by dividing sampling frequencies of 9,000 times within one period of the first signal by resolution 100 and the error value becomes 0. That is, the section counter value and the error value may be defined by an Equation [section counter value*resolution+ error value=frequency of sampling one period of first signal with second signal].

Therefore, when the frequency of sampling one period of the first signal with the second signal is not a multiple of the resolution for detecting the position of the rotor, the error value is present. In the foregoing example, when the resolution is 128, the section counter value becomes 70 and the error value becomes 0.3125. When the resolution is multiplied by the error value, the sampling frequency corresponding to the error value may be computed and in the foregoing example, the sampling frequency corresponding to the error value becomes 40.

The memory unit 130 stores the error value and the section counter value generated by the arithmetic operation unit 150. The counter value and the error value stored in the memory unit 130 are retrieved by the comparison unit 140 to detect the position of the rotor and are used to generate the output signal required to control the motor.

For example, the first signal is sampled with the second signal having a period of 0.1 μs for a first period of the first signal having a period of 900 μs, and when the resolution for detecting the position of the rotor becomes 128, the section counter value becomes 70, the error value becomes 0.3125, and the sampling frequency corresponding to the error value is computed as 40, as computed above. The computed section counter value and error value are stored in the memory unit 130, and the comparison unit 140 counts the frequency in which the counter unit 120 samples the current period of the first signal with the second signal, and compares the counted frequency with the section counter value stored in the memory unit 130.

In connection with the first signal and the second signal of which the values are changed in the same period, the counter unit 120 samples a second period of the first signal 9000 times in total. The comparison unit 140 may count the sampling frequency in which the counter unit 120 has performed the first to 9000$^{th}$ samplings in the second period of the first signal and may increase the output signal by one whenever the counted sampling frequency coincides with the section counter value of a period immediately prior to the first signal stored in the memory 130, that is, 70 assumed above. That is, the comparison unit 10 may change the value of the output signal in such a manner that 1 is added to the output signal when the frequency sampled by the counter unit 120 is 70, and when the frequency sampled by the counter unit 120 becomes 140, 1 is re-added to the output signal.

The counter unit 120 sequentially counts the sampling frequencies and compares the results with the section counter value to increase the output signal and then, when it is determined that the counted sampling frequencies enter an error value compensation section, the comparison unit 140 sums the counted sampling frequency with the sampling frequency corresponding to the error value stored in the memory unit 130 while maintaining the output signal as it is. For example, when it is assumed that the sampling section required to detect the position of the rotor is 0 to 30% and 70 to 100%, the sampling section of 30 to 70% that is not actually used to detect the position of the rotor may be set to the error value compensation section. According to the above assumption, the sampling frequency is 9,000 times within one period of the first signal, such that the sampling section of 2,700 to 6,300 times may be set as the error value compensation section.

According to the above assumed embodiment, the output signal of the comparison unit 140 is increased by one whenever the frequency sampled by the counter unit 120 is a multiple of 70. Therefore, when the comparison with the section counter value, 39 times in total, is completed, and thus the output signal is increased to 39, the sampling frequency counted by the comparison unit 140 is 2,730, and thus the sampling frequency enters the error value compensation section. The comparison unit 140 originally keeps the value of the output signal as 39 within the error value compensation period and matches the sampling frequency with 2,770 by adding the sampling frequency 40 corresponding to the error value stored in the memory unit 130 to the sampling frequency 2,730 counted at that point. Thereafter, even in the case in which the position detection resolution is set to any required number by changing the output signal whenever the sampling frequency is re-counted and is increased to 70 that is the section counter value, the error of the position detection may be prevented.

In this case, the sampling frequency corresponding to the error value is summed in a lump or may be divided into predetermined values and then summed. That is, referring to the above assumed embodiment, the sampling frequency 2,730 counted until the sampling frequency first enters the error value compensation period may be summed with the sampling frequency 40 corresponding to the error value simultaneously.

Alternatively, the sampling frequency 40 corresponding to the error value may be divided four times by 10 and then summed. When the sampling frequency 40 is divided four times by 10 and summed, the relationship between the sampling frequency counted by the comparison unit 140 and the output signal is represented as follows.

TABLE 1

| | Output Signal of Comparator | | | | | |
| --- | --- | --- | --- | --- | --- | --- |
| | 39 | 40 | 41 | 42 | 43 | 44 |
| Counted Sampling Frequency | 2,730 | 2,810 | 2,890 | 2,970 | 3,050 | 3,120 |

That is, when the output signal of the comparator is increased from 39 to 43, the section counter value 70 and the divided error value sampling frequency 10 are summed with the counted sampling frequency whenever the output signal is increased by 1. Referring to Table 1, when the section counter value stored in the memory unit 130 is increased by 70 by returning to the state in which the sampling frequency counted again is not reflected to the error value, the output signal of the comparator is increased from 43 to 44.

Figure 2:
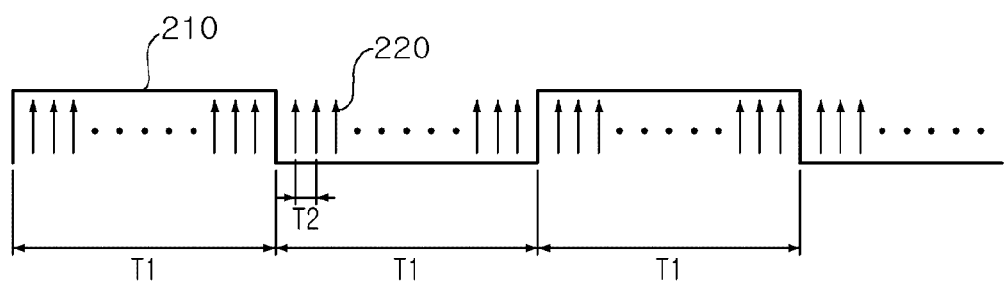
FIG. 2 is a graph for describing an operation of the apparatus for controlling a motor according to an embodiment of the present invention.

FIG. 2 is a graph for describing an operation of the apparatus for controlling a motor according to an embodiment of the present invention.

Referring to FIG. 2, a first signal 210 having a pulse form has a period of T1 and a second signal 220 has a period of T2. The first signal 210 is sampled by the period T2 of the second signal 220. For example, when the period of the first signal 210 is 700 μs and the period of the second signal 220 is 0.2 μs, the counter unit 120 samples the first signal 210, 3500 times, for each period.

In the case that the resolution of detecting the position of the rotor is 100, the section counter value is given as 3,500/100=35 within the first period of the first signal 210 and the error value is given as 0. When the counter unit 120 samples the first signal 210 with the second signal 220 for the second period of the first signal 210, the output signal of the comparison unit 140 is increased by 1 whenever the sampled frequency is accumulated and thus becomes a multiple of the section counter value.

In this case, as the error value is not present, in the present embodiment, the output signal may be generated independent of whether the counted sampling frequency enters the error value compensation section. That is, in the case that the output signal is increased by 1 whenever the sampled frequency is accumulated and thus becomes a multiple of the section counter value, the output signal is changed to a value from 0 until 35 and a process of summing the sampling frequency corresponding to the error value may be omitted.

Next, in the case that the resolution of detecting the position of the rotor is 120, the section counter value becomes 29 and the error value becomes ⅙, within the first period of the first signal 210. Therefore, the sampling frequency corresponding to the error value is ⅙*120=20, such that the process of compensating for the sampling frequency corresponding to the error value is required when the comparison unit 140 generates the output signal.

When the sampling section required to detect the position of the rotor is 0 to 40% and 60 to 100%, 0 to 1400 times and 2100 to 3500 times among the sampling frequencies of a total of 3500 times correspond to a section required to detect the position of the rotor. The comparison unit 140 increases and decreases the output signal whenever the counter unit 120 sequentially counts the sampled results and thus the sampling frequency becomes a multiple of 29, while when the counted sampling frequency enters the error value compensation section of 1400 to 2100 times, the sampling frequencies of 20 times corresponding to the error values are summed with the counted sampling frequency.

When the sampling frequency counted by the comparison unit 140 coincides with a multiple of 29 and thus the output signal is increased to 49, the counted sampling frequency becomes 49*29=1421, and thus enters the error value compensation period. The comparison unit 140 sums the sampling frequency 20 corresponding to the error value with the counted sampling frequency 1421 to remove the error of the position detection that may occur within the second period of the first signal 210. As assumed above, the sampling section of 40 to 60% is not used to detect the position of the rotor, which does not affect the position detection of the rotor even in the case in which the sampling frequencies corresponding to the error values are summed in the error value compensation period.

Figure 3:
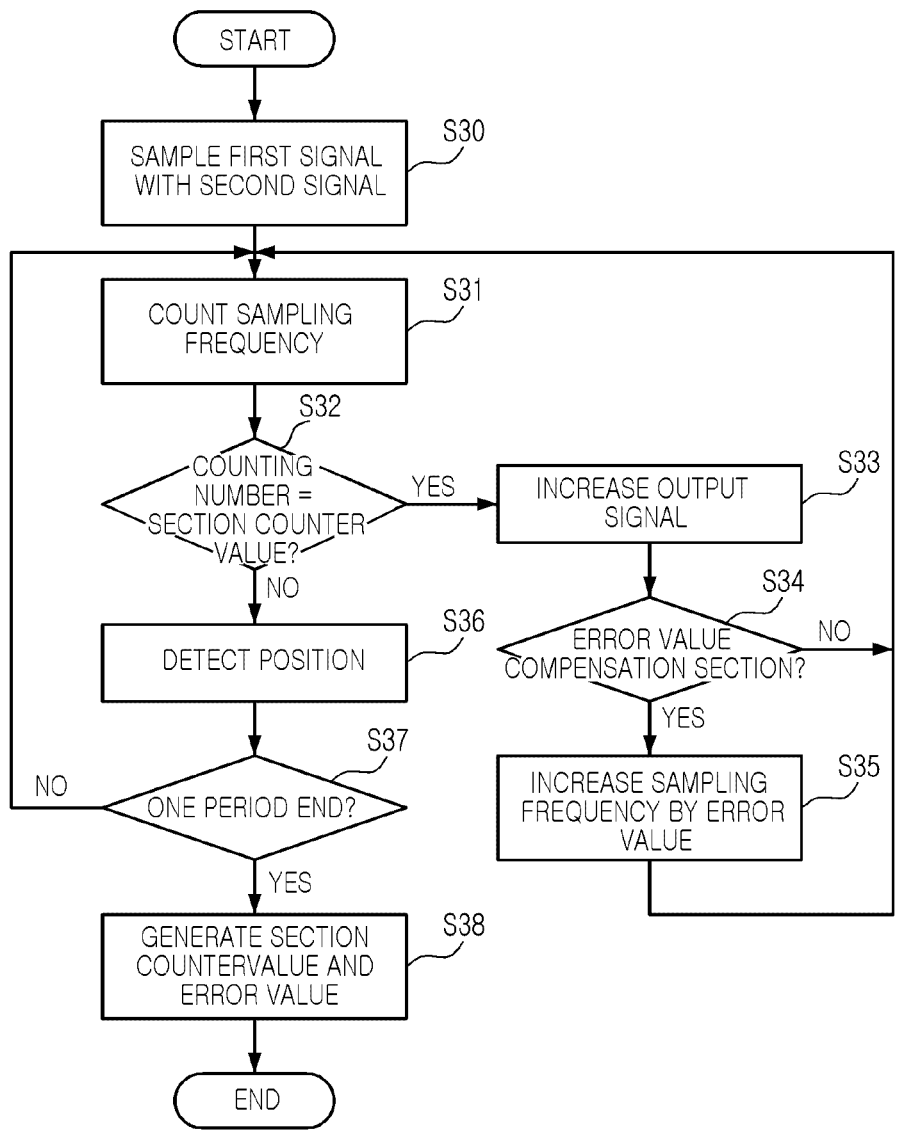
FIG. 3 is a flow chart for describing a method of controlling a motor according to another embodiment of the present invention.

FIG. 3 is a flow chart for describing a method of controlling a motor according to another embodiment of the present invention.

Referring to FIG. 3, a method of controlling a motor according to the embodiment of the present invention starts to sample the first signal 210 with the second signal 220 (S30). As described in FIGS. 1 and 2, the first signal 210 may be a pulse signal having a predetermined period T1 generated from the sensor signal output from the hall sensor, and the like that detects the position of the rotor. The second signal 220 is a signal having a specific period T2 for sampling the first signal 210 and the period T2 of the second signal 220 is shorter than the period T1 of the first signal 210.

When the counter unit 210 samples the first signal 210 with the second signal 220, the comparison unit 140 counts the sampling frequency (S31) to compare the counted frequency with the section counter value stored in the memory unit 130 (S32). The section counter value may be the above defined value and the section counter value used for the comparison of S32 may be the section counter value computed at the just previous period, not the current period of the first signal 210.

As the comparison result of S32, when it is determined that the sampling frequency counted by the comparison unit 140 coincides with the section counter value retrieved from the memory unit 130, the comparison unit 140 increases the output signal by a predetermined value (S33) and determines whether the sampling frequency counted up to the corresponding time enters the error value compensation section (S34). When it is determined that the sampling frequency counted up to the corresponding time does not enter the error value compensation period, the frequency sampled by the counter unit 120 is continuously counted (S31). Otherwise, the sampling frequency corresponding to the error value is summed with the sampling frequency counted up to the corresponding time (S35).

As described above, the sampling frequency corresponding to the error value in the error value compensation section may be summed with the sampling frequency counted up to the corresponding time simultaneously or may be divided multiple times and summed. In this case, when the sampling frequency is divided multiple times and summed, the counted sampling frequency needs to be controlled so that all the corresponding sampling frequencies corresponding to the error values may be summed, prior to being outside of the error value compensation section. Further, when the sampling frequencies are summed multiple times, it is not necessarily to divide and sum the sampling frequency corresponding to the error value as the same value. The reason is that the error value compensation period is the sampling section that is not used to detect the position of the rotor.

As the determination result of S32, when the sampling frequency counted up to the corresponding time does not coincide with the section counter value retrieved from the memory, the position of the rotor is detected based on the output signal of the comparison unit 140 (S36) and it is determined whether one period of the first signal 210 ends (S37). When one period of the first signal 210 does not end, the sampling frequency is continuously counted according to the sampled result output from the counter unit 120 (S31).

On the other hand, when it is determined that one period of the first signal 210 ends, the arithmetic operation unit 150 uses all sampling frequencies of the counter unit 120 and the resolution of detecting the position of the rotor to generate the section counter value and the error value (S38). In S38, the generated section counter value and error value are stored in the memory unit 130 and the subsequent period of the first signal 210 may be sampled so as to be used to detect the position of the rotor.

As set forth above, according to the embodiment of the present invention, the comparator may control the value of the output signal whenever the counter frequency coincides with the section counter value by comparing the section counter value obtained by sampling the immediately previous period of the first signal indicating the position of the rotor with the counter frequency obtained by sampling the current period of the first signal. In addition, according to the embodiment of the present invention, the position of the rotor may be accurately detected by summing the sampling frequency corresponding to the error value of the just previous period of the first signal with the sampling frequency of the current period so as to compensate for the error occurring when the sampling frequency is not the multiple of the required position detection resolution, thereby more precisely controlling the motor.

While the present invention has been shown and described in connection with the embodiments, it will be apparent to those skilled in the art that modifications and variations can be made without departing from the spirit and scope of the invention as defined by the appended claims.

What is claimed is:

1. An apparatus for controlling a motor, comprising:
a signal generation unit generating a first signal indicating position information of a rotor;
a counter unit sampling the first signal with a second signal different from the first signal for one period to count a sampling frequency;
a memory unit storing a section counter value and an error value obtained by sampling a period immediately prior to the first signal with the second signal; and
a comparison unit increasing and reducing an output signal when the sampling frequency counted by the counter unit coincides with the section counter value,
wherein the comparison unit sums the sampling frequencies corresponding to error values with the sampling frequency of the first signal before the counter unit ends the sampling of one period of the first signal.

2. The apparatus of claim 1, wherein the comparison unit sums the sampling frequency corresponding to the error value with the sampling frequency of the first signal when the output signal is included in the section in which the error value is compensated.

3. The apparatus of claim 2, wherein the comparison unit sums all sampling frequencies corresponding to the error value with the sampling frequency of the first signal simultaneously in the section in which the error value is compensated.

4. The apparatus of claim 2, wherein the comparison unit divides the sampling frequency corresponding to the error value in the section in which the error values are compensated and sums the divided sampling frequency with the sampling frequency of the first signal multiple times.

5. The apparatus of claim 2, wherein the comparison unit maintains the value of the output signal as it is when the sampling frequency corresponding to the error value is summed with the sampling frequency of the first signal in the section in which the error value is compensated.

6. The apparatus of claim 1, further comprising an arithmetic operation unit generating the section counter value and the error value according to a precision of detecting the position information of the rotor.

7. The apparatus of claim 1, wherein the comparison unit increases the output signal by a predetermined value whenever a frequency of sampling one period of the first signal by the counter unit coincides with the section counter value.

8. A method of controlling a motor, comprising:
counting a sampling frequency by sampling one period of a first signal indicating position information of a rotor with a second signal;
comparing a section count value of a period immediately prior to the first signal with the sampling frequency; and
controlling an output signal value when the sampling frequency coincides with the section counter value,
wherein the sampling frequency corresponding to an error value of the period immediately prior to the first signal is summed with the sampling frequency of one period of the first signal, before the sampling of one period of the first signal ends.

9. The method of claim 8, wherein all sampling frequencies corresponding to the error value are summed with the sampling frequency of the first signal simultaneously when the output signal is included in the section in which the error value is compensated.

10. The method of claim 8, wherein the sampling frequency corresponding to the error value is divided and summed with the sampling frequency of the first signal multiple times when the output signal is included in the section in which the error value is compensated.

11. The method of claim 8, wherein the value of the output signal is maintained as it is when the sampling frequency corresponding to the error value of the period immediately prior to the first signal is summed with the sampling frequency of one period of the first signal.

12. The method of claim 8, wherein in the controlling of the output signal, the output signal is increased by a predetermined value whenever a frequency of sampling one period of the first signal coincides with the section counter value.

13. The method of claim 8, further comprising:
generating the sampling frequency, the section counter value, and the error value over the one period when the sampling of one period of the first signal ends; and
updating the section counter value and the error value of the period immediately prior to the first signal with the section counter value and the error value over the one period.

* * * * *